United States Patent [19]
Nakamura et al.

[11] Patent Number: 5,578,756
[45] Date of Patent: Nov. 26, 1996

[54] METHOD AND APPARATUS FOR EVALUATING SOUNDNESS OF BLOCK-LIKE STRUCTURES

[75] Inventors: Yutaka Nakamura, Sagamihara; Muneyuki Tamogami, Hachioji; Shinji Sato, Kokubunji; Mitsuhiro Tachibana, Urawa, all of Japan

[73] Assignees: Railway Technical Research Institute and Co. Ltd.; System and Data Research, both of Japan

[21] Appl. No.: 424,001

[22] Filed: Apr. 18, 1995

[30] Foreign Application Priority Data

Jun. 17, 1994 [JP] Japan ................................ 6-159295

[51] Int. Cl.⁶ ............................................. G01M 7/02
[52] U.S. Cl. ................................................ 73/594
[58] Field of Search ........................ 73/594, 579, 654, 73/658; 364/508

[56] References Cited

U.S. PATENT DOCUMENTS

| | | |
|---|---|---|
| 4,164,149 | 8/1979 | Okubo ............................ 73/594 |
| 4,383,446 | 5/1983 | Roeder et al. .................. 73/579 |
| 5,161,521 | 11/1992 | Kasahara et al. ............. 73/579 |
| 5,225,565 | 10/1993 | Judo et al. ..................... 73/594 |

OTHER PUBLICATIONS

RTRI Report, vol. 8, No. 5, 1994, May Nakamura et al., "On a New Method for Piers Inspecting Using Microtremors."

*Primary Examiner*—John E. Chapman
*Attorney, Agent, or Firm*—Lorusso & Loud

[57] ABSTRACT

The soundness of a block-shaped structure is evaluated by disposing one set of at least two three-way sensors on a structure, measuring microtremors, determining the contribution factor of rocking vibration, which occupies part of overall vibration, based upon the results of microtremor measurement, and determining extent of rocking vibration at an arbitrary position of the block-shaped structure based upon the contribution factor. Rocking vibration becomes more prevalent as the state of support afforded by the block-shaped structure becomes more unstable. Accordingly, if rocking vibration becomes dominant and exceeds unity, this fact can be used to evaluate the soundness of the block-shaped structure to collapse.

7 Claims, 4 Drawing Sheets

←—— HORIZONTAL DIRECTION ——→

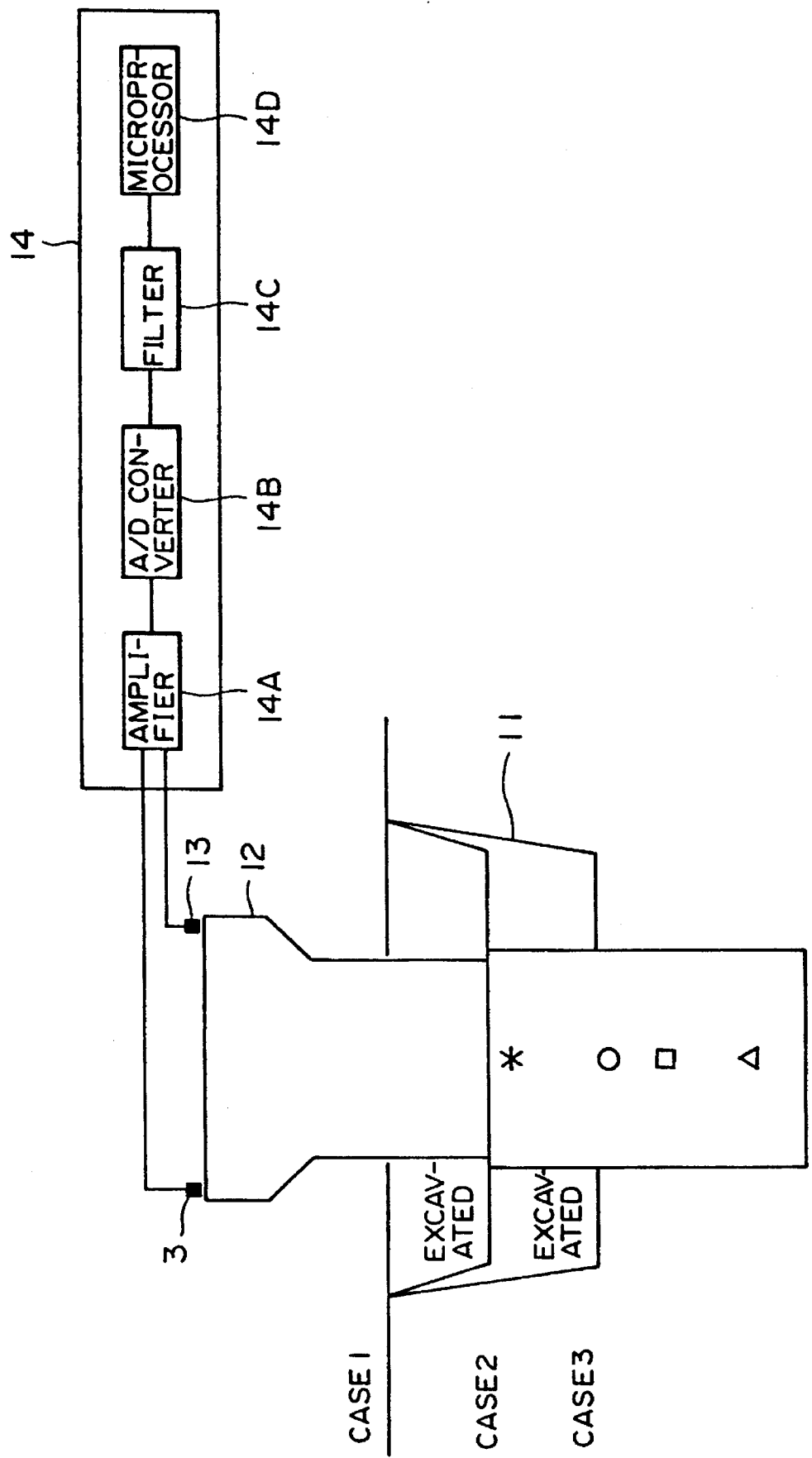

| MEASURED CASE | CONTRIBUTION FACTOR | | R VALUE | |
|---|---|---|---|---|
| | SENSOR 3 | SENSOR 13 | SENSOR 3 | SENSOR 13 |
| PRELIMINARY | 0.23 | 0.27 | 0.09 | 0.10 |
| CASE 1 | 0.57 | 0.65 | 0.44 | 0.50 |
| CASE 2 | 0.80 | 0.84 | 1.30 | 1.38 |
| CASE 3 | 0.81 | 0.84 | 1.50 | 1.52 |
| CASE 4 | 0.61 | 0.79 | 0.61 | 0.81 |
| CASE 5 | 0.32 | 0.62 | 0.18 | 0.34 | ns
METHOD AND APPARATUS FOR EVALUATING SOUNDNESS OF BLOCK-LIKE STRUCTURES

BACKGROUND OF THE INVENTION

This invention relates to a method of evaluating the soundness of block-like structures (piers, bridge abutments, revetment walls and sea walls, etc.) against collapse as well as to an apparatus for practicing this method.

The piers of bridges are always in danger of being washed away and therefore it very important to establish a simple method of evaluating the soundness of piers against collapse.

A method of evaluating the soundness of piers according to the prior art involves evaluating, by visual inspection, the soundness of all piers against collapse, determining which piers are particularly hazardous based upon the results of evaluation, subjecting these hazardous piers to impact in an impact test by striking them with a heavy cone having a weight on the order of 30 kg, measuring the characteristic frequency produced by this impact and evaluating the soundness of the piers against collapse on the basis of a change in the characteristic frequency.

Visual inspection depends upon the individual experience of the inspector and a change in condition that can be identified by visual inspection usually has progressed to a considerable degree. In addition, abnormalities are sometimes overlooked and internal faults sometimes cannot be found. Furthermore, the foundation of a pier cannot be checked by direct visual inspection if the foundation is submerged in water or buried in the ground.

The impact test not only involves the danger that the pier per se and the structure supporting it will be damaged but also requires that care with regard to the surrounding structures and caution with respect to inspection personnel. Moreover, since a large-scale apparatus is required, locations that can be inspected are limited and preparations take time, the latter limiting the amount of time that can be spent on inspection. As a consequence, it is difficult to inspect all piers.

Thus, visual inspection depends too much upon personal experience, abnormalities can go unnoticed and internal faults may not be discovered. The impact test involves risk of damage to structures and injury to inspection personnel and there are limitations in terms of locations that can be inspected and inspection time. This makes it difficult to inspect a large number of locations.

SUMMARY OF THE INVENTION

Accordingly, an object of the present invention is to solve the foregoing problems and provide a method and apparatus for evaluating the soundness of block-like structures in which, when the soundness of block-like structures against collapse is evaluated, it is possible first of all to prevent the overlooking of abnormalities and to discover internal faults, thus eliminating the problems of visual inspection, and to enable structures that could not be subjected to the impact test to be inspected simply and at many locations while assuring the safety of inspection personnel without limitations in terms of locations inspected and time.

Structures are constantly being vibrated by artificial vibration and by microtremors caused by natural phenomena such as weather. The vibrational response of a block-like structure such as a pier caused by such microtremors is measured to evaluate the soundness of the structure.

More specifically, the method of evaluating the soundness of block-like structures according to the present invention is characterized by measuring microtremors sustained by a block-like structure, determining extent of rocking vibration in the block-like structure at an arbitrary position thereof using a contribution factor of rocking vibration, which occupies part of overall vibration, obtained on the basis of horizontal and vertical components of the waveform possessed by the microtremors measured, and making an evaluation to the effect that the block-like structure is in an unstable state with regard to collapse if the determined extent of rocking vibration of the block-like structure at the arbitrary position thereof exceeds unity.

The soundness of a rigid structure is linked to safety against collapse. It is believed that rigid rocking vibration becomes predominant among the types of vibration that occur in a rigid structure in danger of collapse.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram which, in an embodiment wherein the method of evaluating the soundness of a block-like structure according to the present invention is applied to a pier, illustrates the positions of rocking centers in respective measurement cases for experiments in which the foundation of the pier has been excavated to simulate washout and then refilled;

DESCRIPTION OF THE PREFERRED EMBODIMENT

An embodiment of the present invention will now be described in detail with reference to the accompanying drawings.

Figure 1:
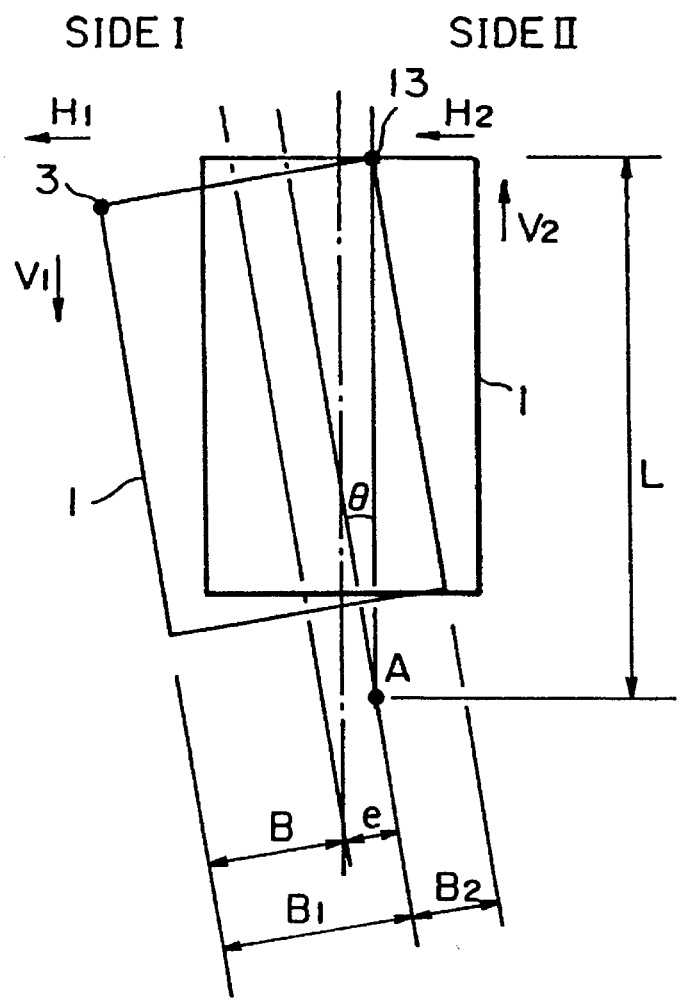
FIG. 1 is a diagram showing the concept of rocking vibration.
Figure 2:
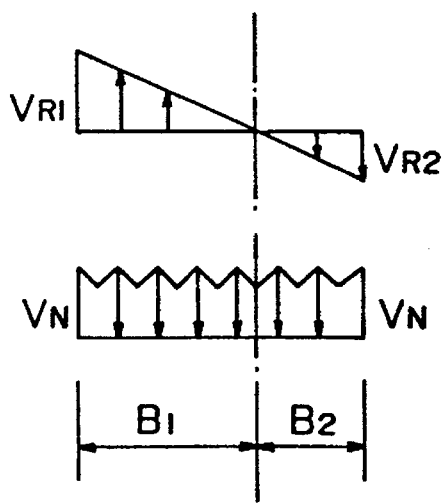
FIG. 2 is a diagram showing vertical components of rocking vibration.

In FIGS. 1 and 2, numeral 1 denotes a block-like structure having a side I and a side II. A three-way sensor 3 is disposed on side I of the block-like structure and a three-way sensor 13 on side II. Further, $H_1$ and $H_2$ represent the horizontal vibration components of the sensors 3 and 13, respectively, and $V_1$ and $V_2$ represent the vertical vibration components of the sensors 3 and 13, respectively. $V_N$ denotes a vertical vibration component other than that due to rocking vibration. $V_{R1}$, $V_{R2}$ represent vertical vibration components of the respective sensors 3, 13 due to rocking vibration. B indicates the distance from the center of the block-shaped structure 1 to the three-way sensors 3, 13; $B_1$ the distance from a rocking center A to the three-way sensor 3 on side I; $B_2$ the distance from the rocking center A to the three-way sensor 13 on side II; e the distance from the rocking center A to the center of the block-shaped structure 1; L the distance from the rocking center A to the upper end of the block-shaped structure 1; and θ the angle of rocking vibration.

Here L and e mentioned above are obtained by the following equations using the symbols in the drawing:

$$L = B(H_1 + H_2)/(V_1 + V_2)$$
$$e = B(V_1 - V_2 / V_1 + V_2)$$
$$= B(1 - V_2/V_1)/(1 + V_2/V_1)$$

The spectrum ratio of microtremors is used in computation.

Furthermore, the vertical vibration component and horizontal vibration component observed in the block-like structure 1 are considered upon being classified into rocking vibration and other vibration as follows:

$$V_1 = V_{R1} + V_N$$
$$V_2 = V_{R2} + V_N$$
$$H_1 = H_2 = H_{R1}(H_{R2}) + H_N$$

where $H_R$, $V_R$ respectively represent the horizontal vibration component and vertical vibration component of rocking vibration and $H_N$, $V_N$ denote noise vibration, namely vibration other than rocking vibration.

When the three-way sensors 3, 13 are disposed on the block-shaped structure 1 and microtremors are measured, the horizontal vibration component and vertical vibration component of rocking vibration become as shown below based upon the results of measurement, as evident from FIG. 1:

$$H_{R1} = H_{R2} = L\theta$$
$$V_{R1} = B_1\theta$$
$$V_{R2} = B_2\theta$$

where $H_{R1}$ represents the horizontal vibration component of the sensor 3 resulting from rocking vibration and $H_{R2}$ represents the horizontal vibration component of the sensor 13 resulting from rocking vibration. Thus the rocking vibration may be construed as being vibration in which vertical motion and horizontal motion are correlated.

Accordingly, rocking vibration which occupies part of overall vibration is represented by a contribution factor ρ, which is defined by as follows:

$$\text{contribution factor } \rho = \frac{\left\{ \sum_{i=1}^{n} H_i \times V_i \right\}^2}{\sum_{i=1}^{n} H_i^2 \times \sum_{i=1}^{n} V_i^2} \quad (1)$$

where n represents the number of samples, $H_i$ (horizontal component) denotes a digitized microtremor amplitude value of the horizontal vibration component at an i-th step, and $V_i$ (vertical component) denotes a digitized microtremor amplitude value of the vertical vibration component at the i-th step. The contribution factor ρ approaches 1 starting from 0 as the correlation between the horizontal vibration component and vertical vibration component of the measured block-shaped structure increases or, in another words, as rocking vibration becomes predominant. It is believed that this change represents the course of a decline in the supporting force of the foundation of the measured block-shaped structure.

However, it can readily be predicted from the foregoing definition that the contribution factor ρ will vary depending upon the horizontal distance (hereinafter referred to as the "sensor distance") from the rocking center to the particular sensor. A relative comparison regarding the extent of rocking vibration can be made using the contribution factor ρ in a case where the sensor distance can be made the same before and after measurement or in a case where a substantially identical sensor distance can be achieved in each block-shaped structure. However, the comparison cannot be made if the sensor distance is different before and after measurement or if the sensor distance differs greatly from one block-shaped structure to another. For this reason, an index which may be used in place of the contribution factor ρ representing the extent of rocking vibration is obtained as follows without relation to sensor distance:

Equation (1) above can be transformed in the following manner:

$$\text{contribution factor } \rho = \frac{1}{\left[1 + \sum_{i=1}^{n}(H_{Ni})^2 / \sum_{i=1}^{n}(L\theta_i)^2\right]} \times \frac{1}{\left[1 + \sum_{i=1}^{n}(V_{Ni})^2 / \sum_{i=1}^{n}(B\theta_i)^2\right]} \quad (2)$$

where $H_{Ni}$ represents a horizontal vibration component other than that of rocking vibration at the i-th step, $V_{Ni}$ a vertical vibration component other than that of rocking vibration at the i-th step and $θ_i$ an angle other than that of rocking vibration at the i-th step. Further, α can be regarded as vibration amplitude magnification at the upper end of the block-shaped structure. More specifically, $$\sum_{i=1}^{n} (H_{Ni})^2 / \sum_{i=1}^{n} (L\theta_i)^2 = 1/\alpha^2$$

holds. In other words, α, which is the reciprocal of the square root of $$\sum_{i=1}^{n} (H_{Ni})^2 / \sum_{i=1}^{n} (L\theta_i)^2 = 1/\alpha^2$$

in the denominator of Equation (2), can be regarded as the vibration amplification factor at the upper end of the block-shaped structure.

Accordingly, $\alpha$ usually is a value larger than 1. If there is any rocking vibration, $$1 + \sum_{i=1}^{n} (H_{Ni})^2 / \sum_{i=1}^{n} (L\theta_i)^2 = 1 + 1/\alpha^2$$

will not take on a value much larger than 1. As a result, the contribution factor $\rho$ can be approximated as follows:

$$\text{contribution factor } \rho \approx \frac{1}{\left[1 + \sum_{i=1}^{n} (V_{Ni})^2 / \sum_{i=1}^{n} (B\theta_i)^2\right]}$$

$$= 1/[1 + 1/R(B)]$$

where B represents distance from the center of the structure to the sensor and R(B) is defined by the following:

$$R(B) = \sum_{i=1}^{n} (B\theta_i)^2 / \sum_{i=1}^{n} (V_{Ni})^2 \qquad (3)$$

$$= \rho/(1-\rho)$$

Here R(B) represents the ratio of the vertical component $V_R$ of rocking vibration to the vertical vibration component $V_N$ other than that of rocking vibration. In other words, R(B) is an index which represents the extent of rocking vibration just as the contribution factor $\rho$ does.

Further, R(B) represents the extent of rocking vibration which prevails when the sensor distance is B. In order to make R(B) a quantity that is independent of sensor distance, the sensor distance is made 1.0 m and the R value is defined anew as follows as a quantity indicating the extent of rocking vibration at this position:

$$R(1) = \sum_{i=1}^{n} (1 \cdot \theta_i)^2 / \sum_{i=1}^{n} (V_{Ni})^2 \qquad (4)$$

$$R \text{ value} = \rho/\beta(1-\rho)$$

where $\beta=(B/1)^2=B^2$ holds and $\beta$ is a transformation coefficient.

The R value is obtained using Equation (4) also when the sensor distance differs before and after measurement or when the sensor distance for one block-shaped structure differs from that of another block-shaped structure, and a relative comparison regarding the stability of a block-shaped structure can be made using the R value.

Further, rocking vibration becomes more prevalent as the state of support becomes more unstable. Accordingly, if rocking vibration becomes dominant and the R value exceeds unity, this fact can be used to evaluate the soundness of the block-shaped structure to collapse.

An embodiment of the present invention will now be described in detail with reference to the drawings.

As shown in FIGS. 3(a)–3(f), experiments were conducted in which the foundation of a pier was actually excavated to simulate washout and then refilled. The measurement apparatus used is as illustrated in FIG. 4. Specifically, the three-way sensors 3, 13 were placed on both sides of the pier and output signals from the three-way sensors 3, 13 were processed by a measurement apparatus 14 comprising an amplifier 14A, an A/D converter 14B, a filter 14C and a microprocessor 14D. As a result, the position L of the rocking center, the contribution factor $\rho$ and the R value were determined.

Figure 3A:
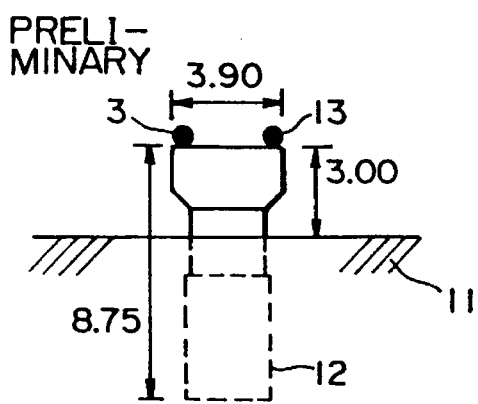
FIG. 3(a) is a diagram illustrating the pier of a block-like structure which undergoes evaluation of soundness according to the present invention.

(1) As shown in FIG. 3(a), the test was applied to a pier 12 placed in the ground 11. The pier 12 had an overall length of 8.75 m, a width of 3.9 m and a height above the ground of 3.00 m (the foundation of the pier was buried to a depth of 5.75 m). The three-way sensors 3, 13 were disposed on both sides of the pier 12 of width 3.9 m and the output signals from the three-way sensors 3, 13 were processed by the measurement unit 14 so as to measure microtremors. The extent of rocking vibration at an arbitrary position was determined, using the contribution factor $\rho$ of rocking motion occupying part of the overall vibration, based upon the horizontal vibration component and vertical vibration component of the waveform of the measured microtremors. (This represents preliminary measurement.)

Figure 3B:
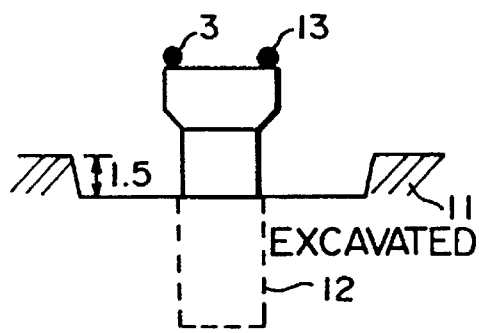
FIG. 3(b) is a diagram illustrating CASE 1, in which the foundation of a pier has been excavated to simulate washout in order to evaluate the soundness of a block-like structure according to the present invention.

(2) This was followed by excavating the foundation to a depth of 1.5 m (leaving the foundation buried to depth of 4.25 m), as illustrated in FIG. 3(b). The measurement described above was performed in the same manner (CASE 1).

Figure 3C:
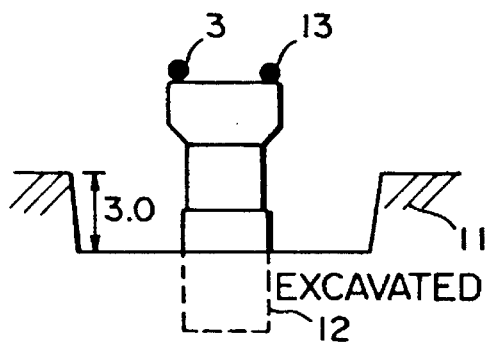
FIG. 3(c) is a diagram illustrating CASE 2, in which the foundation of a pier has been excavated to simulate washout in order to evaluate the soundness of a block-like structure according to the present invention.

(3) This was followed by excavating the foundation to a depth of 3.0 m (leaving the foundation buried to depth of 2.75 m), as illustrated in FIG. 3(c). The measurement described above was performed in the same manner (CASE 2).

Figure 3D:
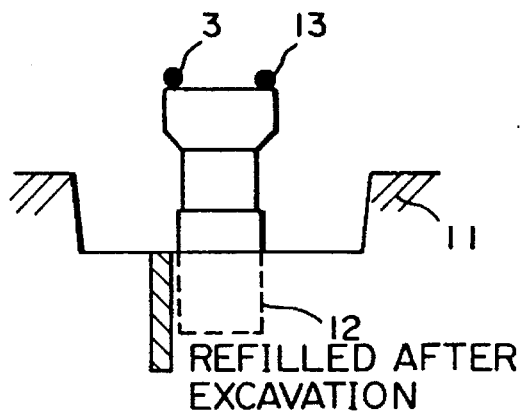
FIG. 3(d) is a diagram illustrating CASE 3 for an experiment in which the foundation of a pier has been excavated to simulate washout and then refilled in order to evaluate the soundness of a block-like structure according to the present invention.

(4) Next, the buried portion of the pier was dug away as an experiment and then refilled, as illustrated in FIG. 3(d), after which the measurement described above was performed (CASE 3).

Figure 3E:
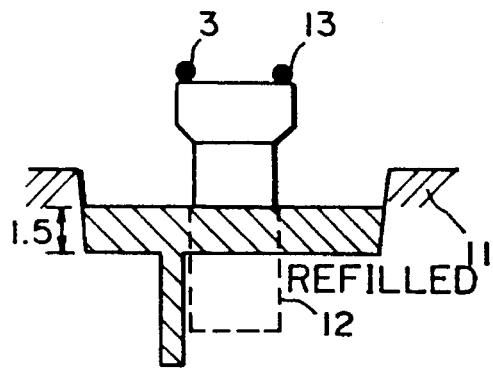
FIG. 3(e) is a diagram illustrating CASE 4 for an experiment in which the foundation of a pier has been excavated to simulate washout and then refilled in order to evaluate the soundness of a block-like structure according to the present invention.
Figure 3F:
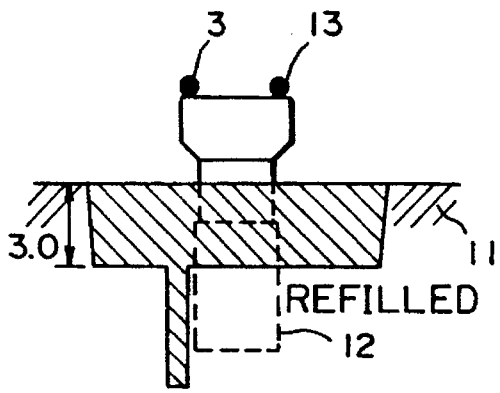
FIG. 3(f) is a diagram illustrating CASE 5 for an experiment in which the foundation of a pier has been excavated to simulate washout and then refilled in order to evaluate the soundness of a block-like structure according to the present invention.

(5) Next, the excavated portion of the foundation was refilled by 1.5 m (making the buried depth of the foundation equal to 4.25 m), as illustrated in FIG. 3(e), and the measurement described above was performed (CASE 4).

(6) Finally, the foundation was refilled to its original state and the measurement described above was performed (CASE 5).

As a result, the position of the rocking center in each measured case can be determined, as shown in FIG. 4. More specifically, the rocking center is at position $\bigcirc$ in CASE 1, at position $\square$ in CASE 2 and at position $\triangle$ in CASE 3. In FIG. 4, the symbol "*" indicates the center of gravity of the pier 12.

Accordingly, it can be understood that the position of the rocking center in each measured case descends as the amount of excavation increases. Since the excavation performed in this experiment corresponds to actual washout of the pier, it will be understood that the pier excavated has a rocking center whose position is lower than that of a sound pier.

Figures 5, 6:
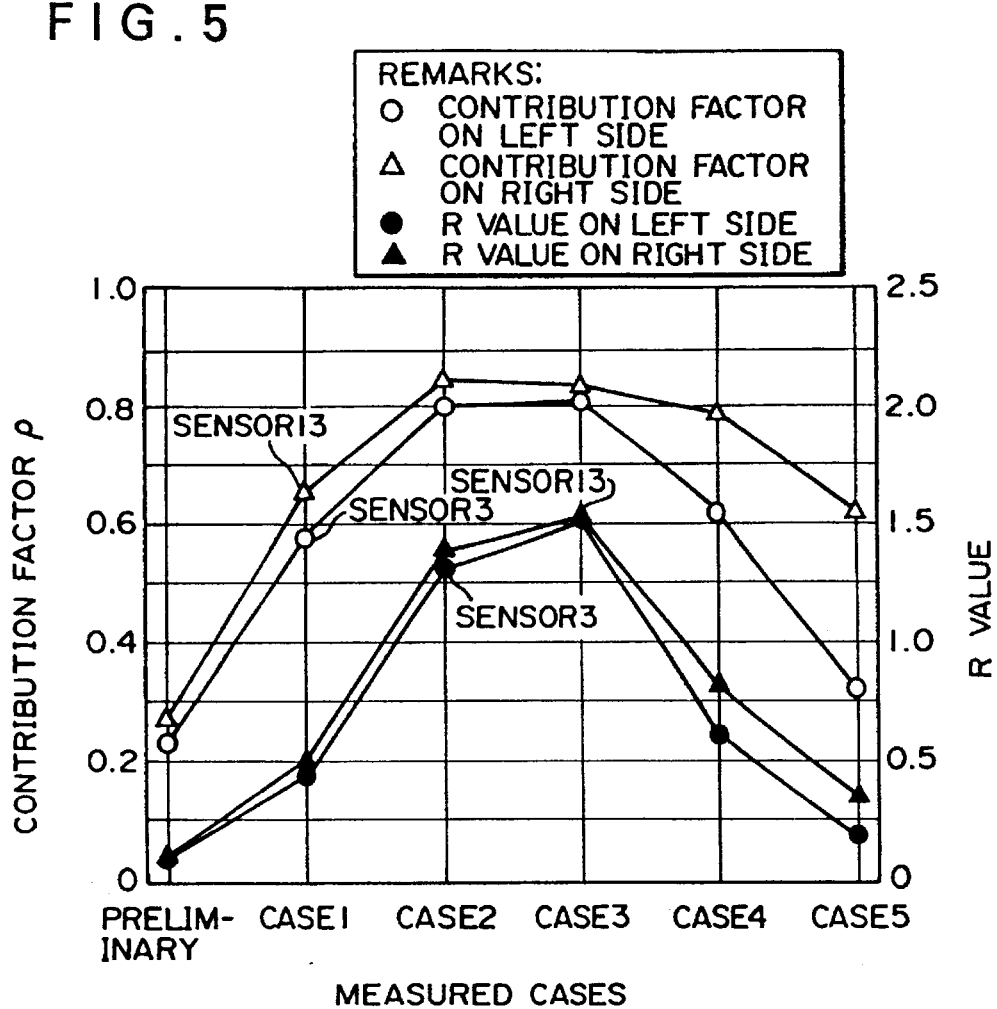
FIG. 5 is a diagram which, in an embodiment wherein the method of evaluating the soundness of a block-like structure according to the present invention is applied to a pier, illustrates a contribution factor ρ and R value in respective measurement cases for experiments in which the foundation of the pier has been excavated to simulate washout and then refilled.
FIG. 6 is a diagram showing results of actual measurement.

The contribution factor $\rho$ and R value in each measured case are as shown in FIG. 5. It will be appreciated that the change in contribution factor $\rho$ and the change in R value both correspond to the state of foundation excavation. The R value becomes particularly large in CASE 2 and CASE 3, in which the amount of excavation is large.

The results of actual measurement are illustrated in FIG. 6.

These results show that in the preliminary case [see FIG. 3(a)], the contribution factor $\rho$ is 0.23 on the side of sensor 3 and 0.27 on the side of sensor 13 and the R value is 0.09 on the side of sensor 3 and 0.10 on the side of sensor 13.

By contrast, in CASE 1, the contribution factor $\rho$ is 0.57 on the side of sensor 3 and 0.65 on the side of sensor 13, and the R value is 0.44 on the side of sensor 3 and 0.50 on the side of sensor 13.

Further, in CASE 2, the contribution factor $\rho$ is 0.80 on the side of sensor 3 and 0.84 on the side of sensor 13, and the R value is 1.30 on the side of sensor 3 and 1.38 on the side of sensor 13.

In CASE 3, the contribution factor ρ is 0.81 on the side of sensor 3 and 0.84 on the side of sensor 13, and the R value is 1.50 on the side of sensor 3 and 1.52 on the side of sensor 13.

In CASE 4, the contribution factor ρ is 0.61 on the side of sensor 3 and 0.79 on the side of sensor 13, and the R value is 0.61 on the side of sensor 3 and 0.81 on the side of sensor 13.

In CASE 5, the contribution factor ρ is 0.32 on the side of sensor 3 and 0.62 on the side of sensor 13, and the R value is 0.18 on the side of sensor 3 and 0.34 on the side of sensor 13.

In the measured cases mentioned above, the R value becomes largest in CASE 2 and CASE 3, where the R value exceeds unity. Thus, it is possible to make an evaluation to the effect the pier has become unstable with respect to collapse.

In the case of a railroad pier, for example, a train which travels on a track supported by the pier can be used as means for subjecting the pier to vibration for the purpose of measurement.

The foregoing embodiment relates to a case in which the method of evaluating the soundness of block-shaped structures of the present invention is applied to a pier. However, the method of evaluating the soundness of block-shaped structures according to the present invention may be similarly applied to block-shaped structures which undergo rigid motion, such as bridge abutments, revetment walls, sea walls and boulders or bare rock on a slope. This makes it possible to evaluate the soundness of these structures against collapse or tumbling.

Thus, in accordance with the present invention, as described above, when the soundness of block-like structures against collapse is evaluated, it is possible first of all to prevent the overlooking of abnormalities and to discover internal faults, thus eliminating the problems of visual inspection, and to enable structures that could not be subjected to the impact test to be inspected simply and at many locations while assuring the safety of inspection personnel without limitations in terms of locations inspected and time.

As many apparently widely different embodiments of the present invention can be made without departing from the spirit and scope thereof, it is to be understood that the invention is not limited to the specific embodiments thereof except as defined in the appended claims.

What is claimed is:

1. A method of evaluating soundness of a block-shaped structure against collapse, comprising the steps of:
   (a) measuring microtremors based upon outputs from at least two three-way sensors mounted at arbitrary positions on the block-shaped structure;
   (b) determining a contribution factor of rocking vibration, which is part of overall vibration, on the basis of horizontal and vertical components of the waveform of the measured microtremors;
   (c) determining extent of rocking vibration at said arbitrary positions using the determined contribution factor; and
   (d) evaluating the block-like structure as being in an unstable state with regard to collapse responsive to a determination that the determined extent of rocking vibration R of the block-like structure at one of the arbitrary positions exceeds unity.

2. A method of evaluating soundness of a block-shaped structure against collapse, comprising the steps of:
   (a) applying vibration for measurement purposes to induce microtremors in the block-shaped structure;
   (b) measuring the microtremors based upon outputs from at least two three-way sensors mounted at arbitrary positions on the block-shaped structure;
   (c) determining a contribution factor of rocking vibration, which is part of overall vibration, on the basis of horizontal and vertical components of the waveform of the microtremors measured;
   (d) determining extent of rocking vibration at said arbitrary positions using the determined contribution factor; and
   (e) evaluating the block-like structure as being in an unstable state with regard to collapse responsive to a determination that the determined extent of rocking vibration of the block-like structure at one of the arbitrary positions exceeds unity.

3. The method according to claim 1, wherein said block-shaped structure is a pier, bridge abutment, revetment wall or sea wall having a lower portion buried in the earth.

4. The method according to claim 2 wherein said block-shaped structure is a pier, bridge abutment, revetment wall or sea wall having a lower portion buried in the earth.

5. An apparatus for evaluating soundness of a block-shaped structure against collapse, comprising:
   (a) a set of at least two three-way sensors for placement at arbitrary positions on the block-shaped structure;
   (b) means for measuring microtremors based upon outputs from said three-way sensors;
   (c) means for determining a contribution factor of rocking vibration, said contribution factor being part of overall vibration, on the basis of horizontal and vertical components of the waveform of the microtremors measured and for determining the extent of rocking vibration, based on said determined contribution factor; and
   (d) means for evaluating the block-like structure as being in an unstable state with regard to collapse responsive to a determination that the determined extent of rocking vibration of the block-like structure at one of said arbitrary positions exceeds unity.

6. An apparatus for evaluating soundness of a block-shaped structure against collapse, comprising:
   (a) a set of at least two three-way sensors for placement on the block-shaped structure;
   (b) means for applying vibration to said block-shaped structure to induce microtremors therein;
   (c) means for measuring the microtremors based upon outputs from said three-way sensors;
   (d) means for determining a contribution factor of rocking vibration, which is part of overall vibration, on the basis of horizontal and vertical components of the waveform of the microtremors measured; and
   (e) evaluating means for making an evaluation to the effect that the block-like structure is in an unstable state with regard to collapse if the determined extent of rocking vibration of the block-like structure at a sensor exceeds unity.

7. The apparatus according to claim 6, wherein said block-shaped structure is a railroad pier, and said means for applying the vibration for measurement purposes is a train which travels on a track supported by the pier.

* * * * *